(12) United States Patent
Nishiie

(10) Patent No.: US 7,952,762 B2
(45) Date of Patent: *May 31, 2011

(54) ELECTRONIC BLACKBOARD

(75) Inventor: Toru Nishiie, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/721,330

(22) Filed: Mar. 10, 2010

(65) Prior Publication Data

US 2010/0165416 A1 Jul. 1, 2010

Related U.S. Application Data

(62) Division of application No. 11/942,110, filed on Nov. 19, 2007, now Pat. No. 7,733,529.

(30) Foreign Application Priority Data

Nov. 22, 2006 (JP) ................. 2006-316183

(51) Int. Cl.
*G06F 15/00* (2006.01)
*G06F 3/12* (2006.01)
*G06K 15/22* (2006.01)
*H04N 1/00* (2006.01)

(52) U.S. Cl. ............ 358/1.9; 358/1.1; 358/1.3; 358/1.6; 358/1.15; 358/1.16

(58) Field of Classification Search ............. 358/1.9, 358/401, 1.13, 1.15, 1.16, 1.1, 1.3, 1.6; 347/19; 719/321; 711/114, 115, 156, 170, 173, E12.016
See application file for complete search history.

(56) References Cited

U.S. PATENT DOCUMENTS

| 6,009,240 A | 12/1999 | Eguchi et al. |
| 6,744,426 B1 | 6/2004 | Okamoto |
| 2005/0012770 A1* | 1/2005 | Endo ........................ 347/19 |

FOREIGN PATENT DOCUMENTS

| JP | 08-230389 A | 9/1996 |
| JP | 10-336369 A | 12/1998 |
| JP | 11-053520 A | 2/1999 |
| JP | 2000-244735 A | 9/2000 |
| JP | 2004-15371 A | 1/2004 |
| JP | 2004-015619 A | 1/2004 |

OTHER PUBLICATIONS

Japanese Office Action dated Jan. 8, 2009, issued in counterpart Japanese application No. 2006-316183, and partial English translation thereof.

* cited by examiner

*Primary Examiner* — Charlotte M Baker
(74) *Attorney, Agent, or Firm* — Patterson & Sheridan, LLP

(57) ABSTRACT

A copy button is pushed to output image data to an external storage medium, such as a USB memory. Then, a process for writing the image data in the USB memory is executed, and an image corresponding to the image data is printed. When the printed image is light, a density controlling button is pushed, and then, the copy button is pushed again. The image data is called up from a RAM, and a process for causing a density of the image data to be darker is executed, via a tone translator of the electronic blackboard. The image data on which image density control has been executed is written over the data previously stored in the USB memory.

1 Claim, 15 Drawing Sheets

Fig. 6

| BEFORE TRANSLATING GRADIENT | AFTER TRANSLATING GRADIENT |
|---|---|
| 0 | 0 |
| 5 | 6 |
| 10 | 13 |
| 15 | 19 |
| 20 | 26 |
| 25 | 32 |
| 30 | 38 |
| 35 | 45 |
| ⋮ | ⋮ |
| 175 | 223 |
| 180 | 230 |
| 185 | 236 |
| 190 | 242 |
| 195 | 249 |
| 200 | 255 |
| ⋮ | ⋮ |
| 255 | 255 |

Fig. 8(A)

| g(i−1, j−1) | g(i, j−1) | g(i+1, j−1) |
|---|---|---|
| g(i−1, j) | g(i, j) | g(i+1, j) |
| g(i−1, j+1) | g(i, j+1) | g(i+1, j+1) |

Fig. 8(B)

| a | b | c |
|---|---|---|
| d | e | f |
| g | h | i |

Fig. 8(C)

| 1/10 | 1/10 | 1/10 |
|---|---|---|
| 1/10 | 2/10 | 1/10 |
| 1/10 | 1/10 | 1/10 |

Fig. 8(D)

| −1 | −1 | −1 |
|---|---|---|
| −1 | 9 | −1 |
| −1 | −1 | −1 |

MODE METHOD

DISCRIMINANT ANALYSIS METHOD

ELECTRONIC BLACKBOARD

CROSS REFERENCE TO RELATED APPLICATION

The present application is a Divisional Application of U.S. application Ser. No. 11/942,110 filed Nov. 19, 2007 now U.S. Pat. No. 7,733,529, which is based on and claims the benefit of priority of Japanese Patent Application P2006-316183 filed on Nov. 22, 2006, the entire contents of both of which are incorporated herein by reference.

BACKGROUND OF THE INVENTION

1. Field of the Invention

The present invention relates to an electronic blackboard which is capable of outputting image data, which is read from a screen, to a removable external storage medium. In this application, "electronic blackboard" refers to an electronic board on which information can be written. The board is not necessary black, and may be, for example, a whiteboard.

2. Discussion of Related Art

An electronic blackboard is known which is capable of reading an image, which is written on a screen using a writing material(s), as image data using an optical sensor, such as a CCD, and which is capable of printing out the image data using a printer. The electronic blackboard is used in companies and research institutes at meetings, for instance.

Recently, an electronic blackboard has been made available which is capable of outputting read image data not only to a printer but also to an external storage medium, such as a flash memory.

For example, Japanese Laid Open Publication No. 2004-015371 discloses an electronic blackboard which has an external interface. According to this publication, image data read from a screen is transmitted to an external terminal via the external interface.

In a conventional electronic blackboard, the writing on the screen may be light due to worn-out writing materials and/or differences in writing pressure. In this case, the read image data is also light, which causes a problem whereby a printed image is light or unprintable. In addition, a conventional electronic blackboard may be unable to capture useful image data because the read image data has an imperfection.

Japanese Laid Open Publication No. 2000-244735 discloses an electronic blackboard, which enables arbitrarily setting a binary threshold for each read image data to prevent a printed image from being light or becoming unprintable, when a density control is executed.

In a conventional electronic blackboard, however, an operator cannot accurately confirm whether or not image data has an imperfection, when the operator attempts to output the image data to an external storage medium.

SUMMARY OF THE INVENTION

Accordingly, an object of the present invention is to provide an electronic blackboard which prevents the image data from failing to be written in an external storage medium.

According to one aspect of the present invention, an electronic blackboard includes: (i) a writing surface; (ii) an optical reader for optically reading an image written on the writing surface and for outputting the read image as image data; (iii) a printer; (iv) a connector for removably connecting an external storage medium; (v) an input device operable by an operator to input a first instruction to instruct the optical reader to read the image on the writing surface, and a second instruction for starting density controlling process for causing a density of the image data of the read image to be darker; (vi) an image controller for executing the density controlling process on the image data of the read image; (vii) a memory for temporarily storing the image data outputted from the optical reader, and (viii) a controller.

The controller, in response to the first instruction: controls the electronic blackboard to read the image on the writing surface optically by the optical reader; controls the electronic blackboard to print an image by the printer based on the image data outputting from the optical reader; and controls the electronic blackboard to temporarily store the image data outputted from the optical reader in the memory, and to store the image data in the external storage medium connected to the connector.

And the controller, in response to the second instruction being input after the first instruction, controls the electronic blackboard to execute, with the image controller, the density controlling process on the image data temporarily stored in the memory, and to update the image data stored in the external storage medium with the image data on which the density controlling process has been executed.

According to another aspect of the present invention, an electronic blackboard includes: (i) a writing surface; (ii) an optical reader for optically reading an image written on the writing surface and for outputting the read image as image data; (iii) a printer; (iv) a connector for removably connecting an external storage medium; (v) an input device operable by an operator to input a first instruction to instruct the optical reader to read the image on the writing surface, and a second instruction for starting a density controlling process for causing a density of the image data of the read image to be darker; (vi) an image controller for executing the density controlling process on the image data of the read image; and (vii) a controller.

The controller, in response to the first instruction: controls the electronic blackboard to read the image on the writing surface optically by the optical reader; controls the electronic blackboard to print an image by the printer based on the image data outputting from the optical reader; and controls the electronic blackboard to store the image data outputted from the optical reader in the external storage medium connected to the connector.

And the controller, in response to the second instruction being input after the first instruction, controls the electronic blackboard to read again the image on the writing surface optically by the optical reader; and controls the electronic blackboard to execute, with the image controller, the density controlling process on the image data outputted from the optical reader after reading the image again, and to update the image data stored in the external storage medium with the image data on which the density controlling process has been executed.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 6 is an exemplary diagram to describe an embodiment of a density controlling process;

FIG. 8 is an exemplary diagram to describe another embodiment of the density controlling process;

DETAILED DESCRIPTION OF THE PREFERRED EMBODIMENTS

An embodiment of the present invention will be described below by referring to FIGS. 1 through 10.

Figure 1:
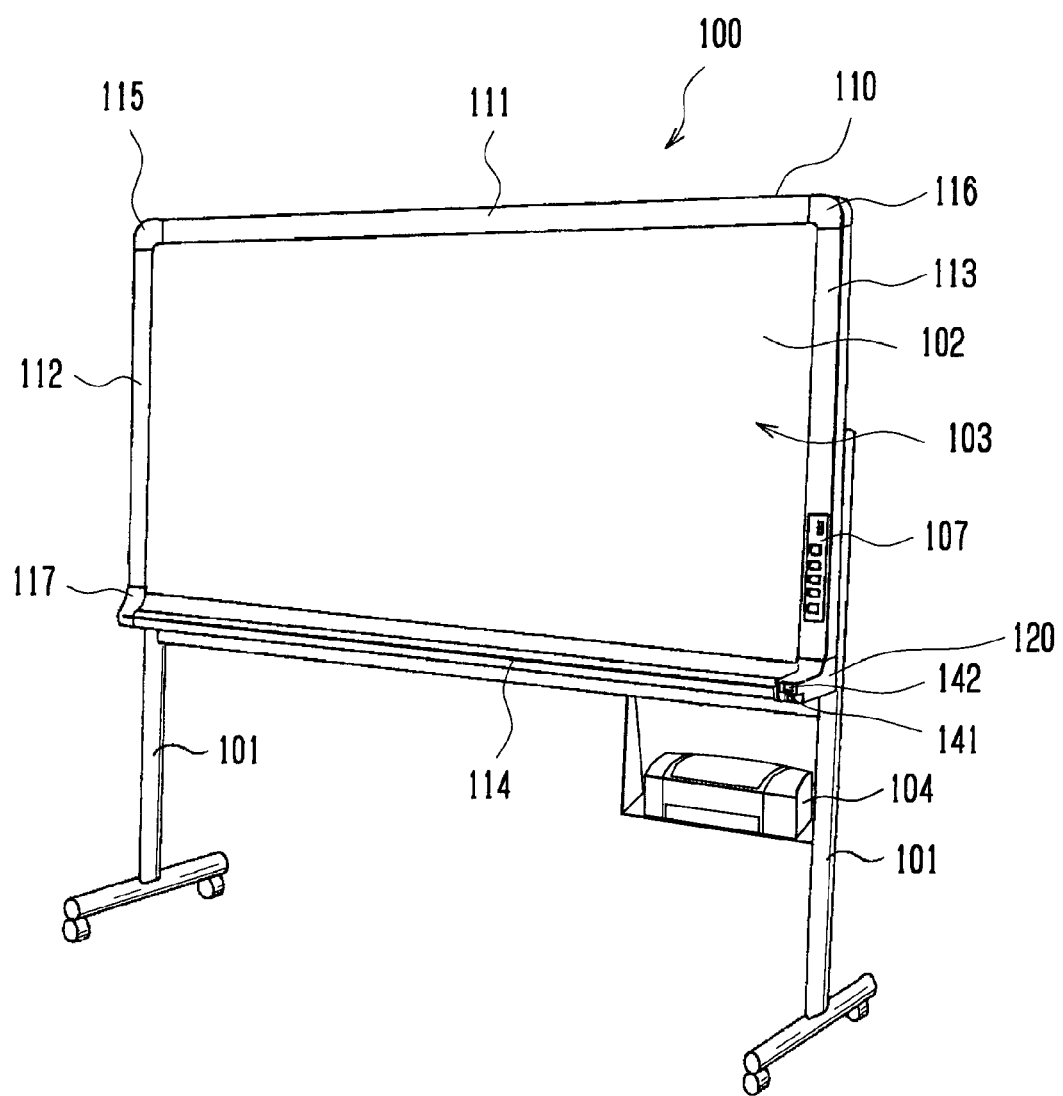
FIG. 1 is a perspective view showing an electronic blackboard with respect to an embodiment of the present invention.

As shown in FIG. 1, an electronic blackboard 100 according to one embodiment of the present invention has a rectangular frame 110, which is supported by a pair of stands 101. The frame 110 houses an endless-type writing screen 102, which is, for example, a polyethylene screen. A part of the screen 102 that is exposed from an opening part of a front side of the frame 110 serves as a writing surface 103 (a board surface) on which an image, including, for example, letter(s) and/or diagram(s), is written by the writing materials. A printer 104 is provided at the bottom-right of the frame 110. The printer 104 prints an image read by a CCD line sensor 304 (FIGS. 2 and 3) on paper (not shown) and issues paper with the printed image.

The frame 110 has an upper peripheral part 111 located at an upper part of the writing surface 103, a left side peripheral part 112 and a right side peripheral part 113 located at left and right sides, respectively, of the writing surface 103, and a bottom platform 114 located at a bottom part of the writing surface 103.

The upper peripheral part 111 and the left side peripheral part 112 are connected via a left side corner member 115 located at the left side of the upper peripheral part 111, and the upper peripheral part 111 and the right side peripheral part 113 are connected via a right side corner member 116 located at the right side of the upper peripheral part 111. The bottom platform 114 is connected to the left side peripheral part 112 via a left bottom side corner member 117 located at the bottom of the left side peripheral part 112, and the bottom platform 114 is connected to the right side peripheral part 113 via a right bottom side corner member 120 located at the bottom of the right side peripheral part 113.

The bottom platform 114 is formed so as to protrude from the writing surface 103 in a front direction (as shown in FIG. 1). A maker pen and an eraser, for example, can be placed on the bottom platform 114. Moreover, the bottom platform 114 catches ink scum, which is formed when an image on the writing surface 103 is erased by the eraser.

An input device 107 having various buttons for operating the electronic blackboard 100 is integrally provided at the right side peripheral part 113 of the frame 110.

A power supply switch 141 for executing an on/off operation of the electronic blackboard 100, and a USB port 142 for connecting a USB memory 150 are located at the right bottom side corner member 120.

Figure 2:
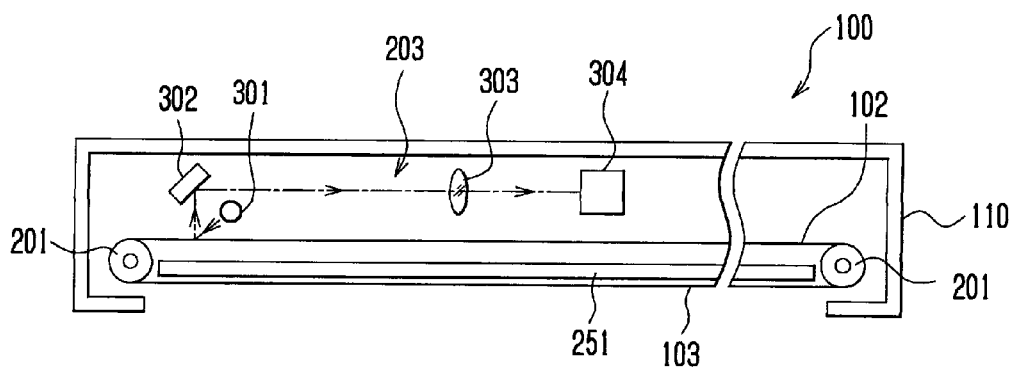
FIG. 2 is a transverse plane view showing an internal structure of the electronic blackboard schematically.

As shown in FIG. 2, a pair of rollers 201 for rolling and conveying the screen 102 are provided at right and left end parts within the frame 110. The rollers 201 have a core shaft that extends in a vertical direction. The endless-type screen 102 is stretched over the pair of rollers 201. A motor 202 (see FIG. 4) is connected to one of the rollers 201 via a belt transmission mechanism (not shown). When the motor 202 is driven, the rollers 201 are rolled via the belt transmission mechanism. The screen 102 is rolled and conveyed in the right and left (i.e., horizontal) direction by rotation of the rollers 201.

A writing board 251 for ensuring that it is possible to write on the writing surface 103 is provided just behind the writing surface 103 of the screen 102.

Figure 3:
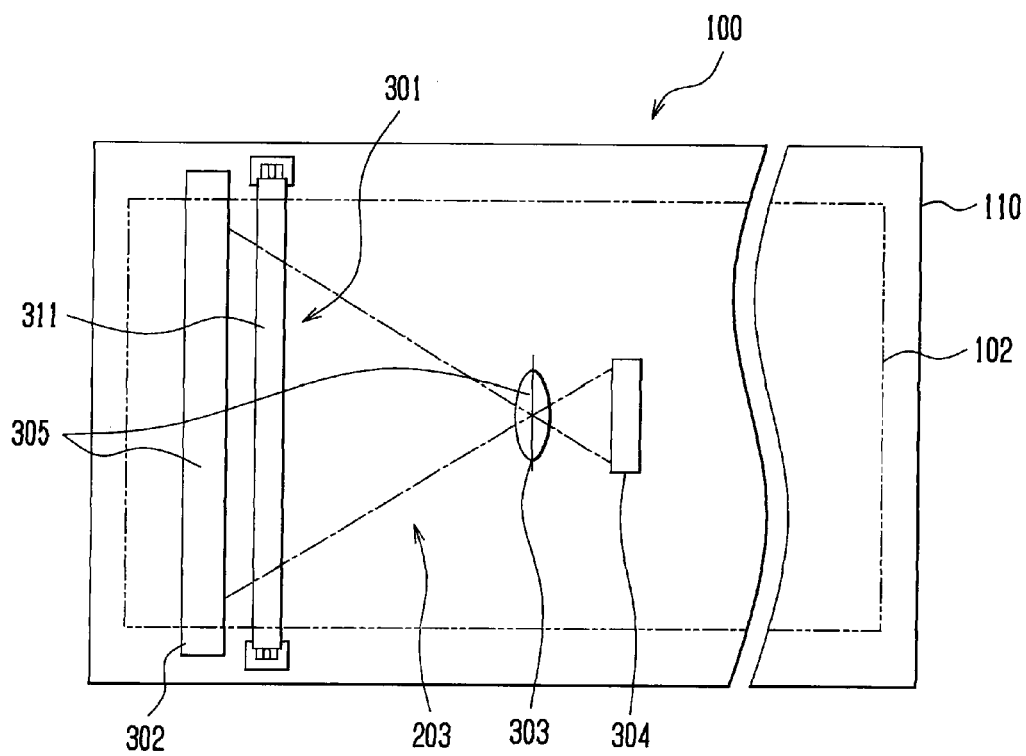
FIG. 3 is a longitudinal front view showing an internal structure of the electronic blackboard schematically.

An optical reader 203 for reading an image written on the writing surface 103 to obtain image data is provided at an opposite side of the screen 102 (hereinafter, called a back surface side of the screen 102) from the side where the writing surface 103 is provided. The optical reader 203 includes a light source 301 located near one of the rollers 201 at the back surface side of the screen 102 to irradiate a light to the screen 102. The light source 301 includes a fluorescent light 311 (FIG. 3). The optical reader 203 also includes an optical system 305 (FIG. 3) and a CCD line sensor 304. As shown in FIGS. 2 and 3, the optical system 305 includes a mirror 302 and a lens 303. The optical system 305 is a reduction optical system for collecting light reflected by the screen 102, when the light source 301 irradiates a light to the screen 102. The CCD line sensor 304 is receives the light collected by the optical system, 305.

Figure 4:
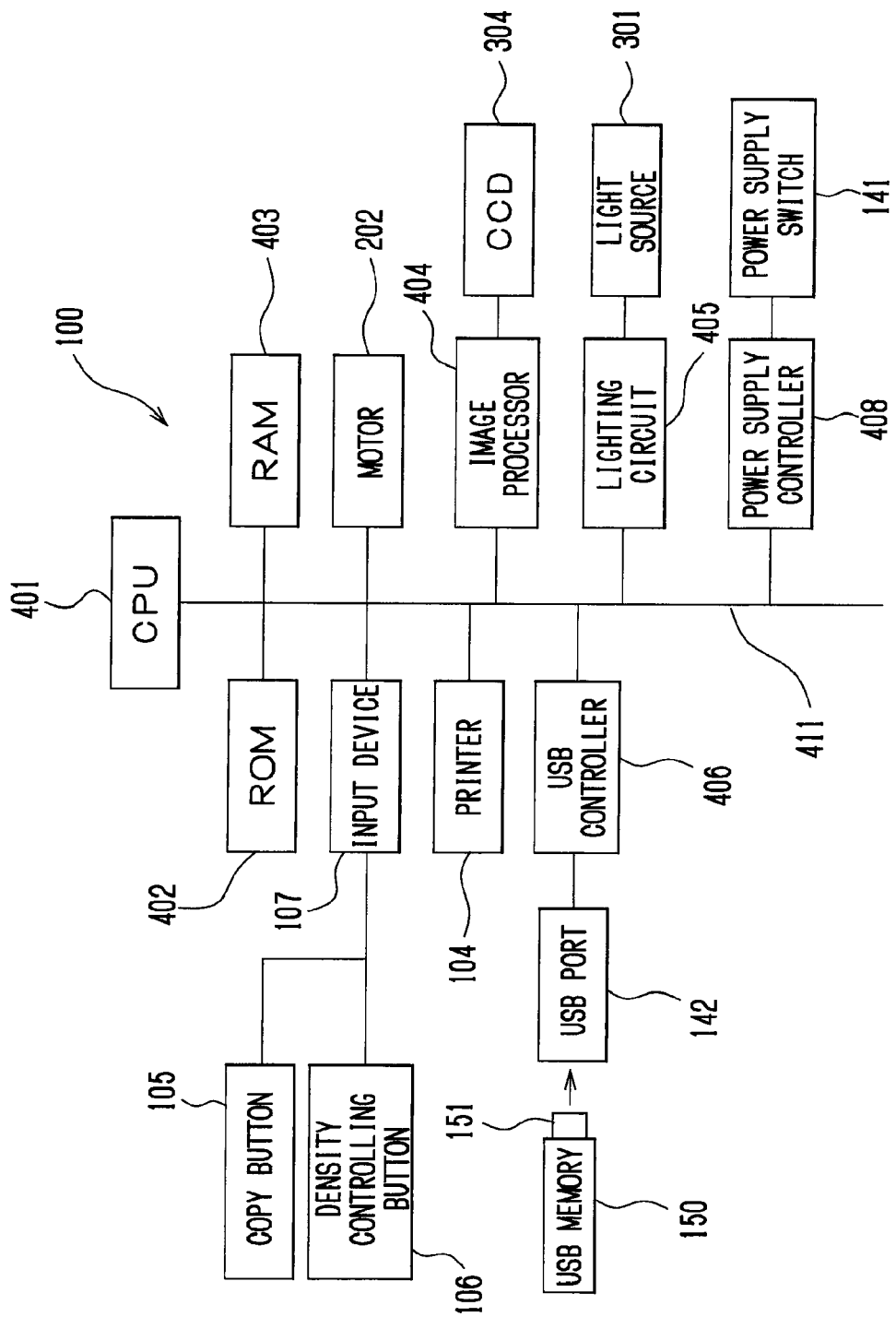
FIG. 4 is a block diagram showing a hardware structure of the electronic blackboard.

FIG. 4 is a block diagram showing a hardware structure of the electronic blackboard. As shown in FIG. 4, the electronic blackboard 100 has a CPU 401 as a controller for controlling various operations. A ROM 402, a RAM 403, an image processor 404, a lighting circuit 405, and a power supply controller 408 are connected to the CPU 401 via a bus line 411. The ROM 402 is a memory for storing fixed data such as a control program and includes an image processing parameter section for storing an image processing parameter(s). The RAM 403 is a memory for temporarily storing various data, and the RAM 403 is used as a work area. The image processor 404 is connected to the CCD line sensor 304, and executes various image processes for the read image data. The lighting circuit 405 is connected to the light source 301, and controls lighting of the light source 301. The power supply controller 408 controls a power supply device which provides each part of the electronic blackboard with electric power. The power supply controller 408 is operated by the power supply switch 141, and executes an on/off operation of the electronic blackboard 100.

In addition, input/output circuits of the printer 104, the input device 107, and the motor 202 are connected to the CPU 401 via the bus line 411. The input device 107 includes a copy button 105 as a first input device, and a density controlling button 106 as a second input device. The copy button 105 is operated to start reading of an image on the screen 102. The density controlling button 106 is operated to start a process for causing a density of the read image data to be darker.

Further, a USB port 142 is connected to the CPU 401 via the USB controller 406 and the bus line 411. A USB memory 150 is removably connected to the USB port 142 via a connecting terminal 151 of the USB memory 150.

Figure 5:
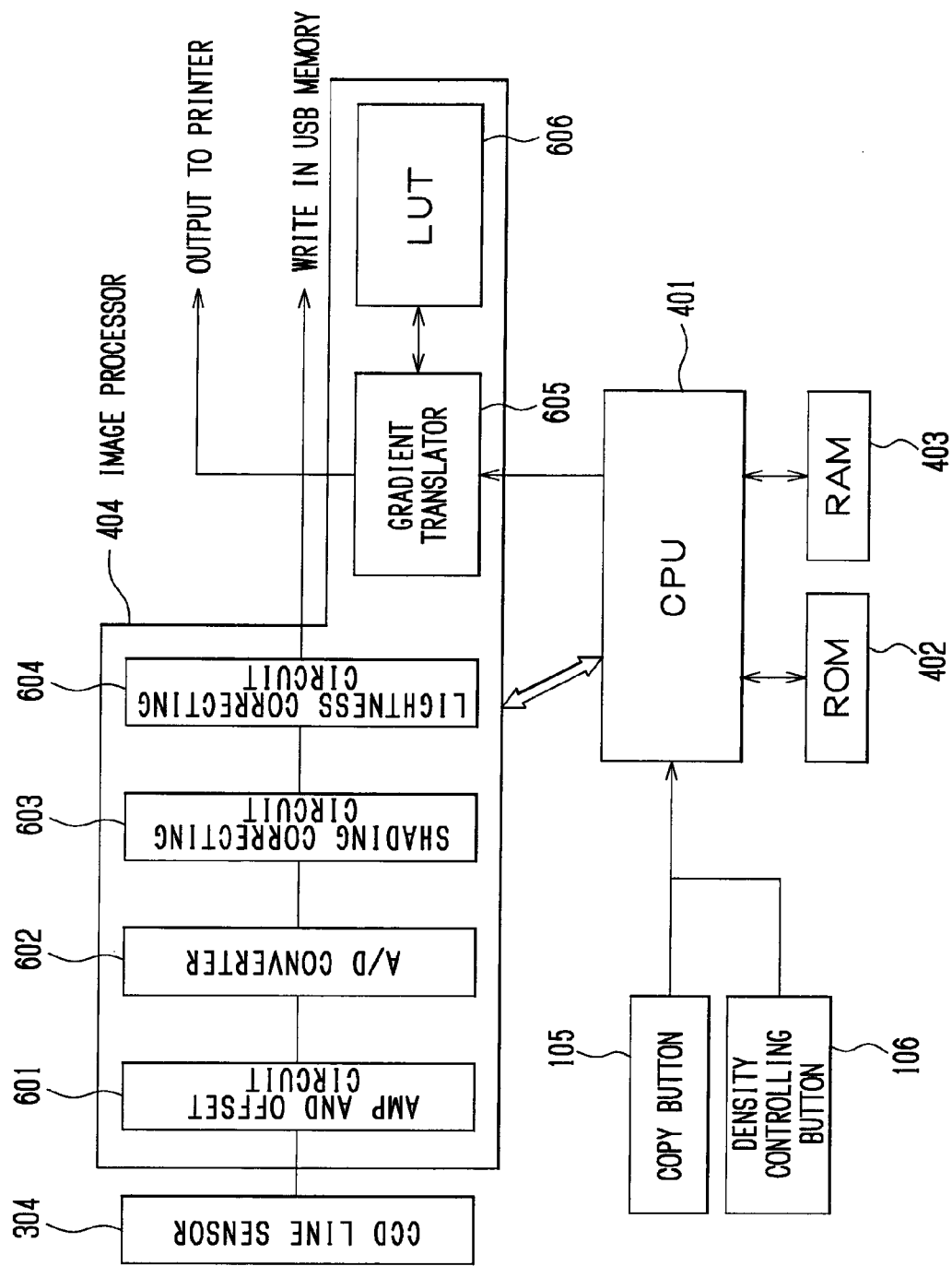
FIG. 5 is a block diagram showing a structure of an image processor.

FIG. 5 is a block diagram showing a structure of the image processor 404. The image processor 404 is constituted by a digital circuit. As shown in FIG. 5, an output end of the CCD line sensor 304 is connected to an input end of an amplifier (AMP) and offset circuit 601, which amplifies and offsets (shifts) an analog image signal outputted from the CCD line sensor 304. An output end of the AMP and offset circuit 601 is connected to an input end of an analog/digital converter 602 (hereinafter, referred to as an A/D converter 602). The A/D converter 602 converts an analog image signal, which is read from the CCD line sensor 304, to a digital image signal. An output end of the A/D converter 602 is connected to an input end of a shading correcting circuit 603 which executes a shading correction on the digital image data converted by the A/D converter 602. An output end of the shading correcting circuit 603 is connected to an input end of a lightness correcting circuit 604 which executes a lightness correction on the image data. The image processor 404 has a structure so as to output the image data, on which each of the image processes have been executed by elements 601, 602, 603, and 604, from the output end of the lightness correcting circuit 604 to a USB port 142 and a printer 104.

The image processor 404 includes a gradient translator 605 for translating a gradient of a pixel of the image data which is called up from the RAM 403 based on control by the CPU 401. The gradient translator 605 serves as an image controller. A look-up table 606 (hereinafter, referred to as a LUT) is connected to the gradient translator 605. A gradient translating table, which is referred when a gradient of a pixel is translated, is set previously in the LUT 606.

FIG. 6 is an exemplary diagram showing an example of the gradient translating table in the LUT 606. As shown in FIG. 6, the gradient translating table set in the LUT 606 shows a gradient after translating of an original image which is read to the gradient translator 605. A pixel of the image data, which is read from the screen 102 by the optical reader 203, is converted to an 8-bit digital signal by the A/D converter 602. Therefore, a gradient of the digital signal is shown as an integer value from 0 to 255. 0 is a maximum value of a white level, 255 is a maximum value of a black level. For example, if the gradient is approximately 125, it is an approximately intermediate level between the black level and the white level. That is, the color is gray.

A value in the gradient translating table in FIG. 6, which is shown as an example, shows a value of a gradient before and after translating an inputted pixel. A pixel in a low gradient side (white level side) can be shifted to a high gradient side (black level side), when the translation is executed based on the gradient translating table in FIG. 6.

In the electronic blackboard 100 which has the structure described above, reading of the image from the screen 102 is started when the copy button 105 located on the input device 107 is pushed. At first, the light source 301 is lighted by driving the light circuit 405, and the motor 202 is driven to rotate. Thus, a light from the light source 301 is irradiated to the writing surface 103 on the screen 102 which is moved by the movement of the motor to the back surface side of the screen. The optical system 305 collects the reflected light from the writing surface 103. The CCD line sensor 304 receives the collected light in units of one line. At a result, the image written on the writing surface 103 is read to obtain image data.

The image data, which is read in units of one line by the CCD line sensor 304, is converted to an electric signal. The electric signal is converted to digital signal image data at the A/D converter 602, after controlling the gain and the offset (by AMP and offset circuit 601). After the conversion to the digital signal image data, errors of shading distortion are corrected. The shading distortion is caused by a number of elements which constructs the CCD line sensor 304. Shading correction that is, already known in the art is executed for each read pixel signal in the shading correcting circuit 603. Further, the lightness correction is executed in the lightness correcting circuit 604, and then, the read pixel signals are stored in the RAM 403 as image data on which each of the image processes has been executed. An image based on the image data stored in the RAM 403, is printed on a paper by driving the printer 104. Also, the image data stored in the RAM 403 is written in the USB memory 150 in the USB port 142 via the USB controller 406, for example, in the TIFF format.

As explained in more detail below, the image data stored in the RAM 403 is called up, and the process for causing a density of the image data to be darker is executed on the image data, by, after pushing the copy button 105 (of the input device 107) once, pushing the density controlling button 106 (of the input device 107) and then pushing the copy button 105 again. The image data on which density controlling process has been executed is outputted to the USB port 142 again, and the image data overwrites existing image data in the USB memory 150.

Figure 7:
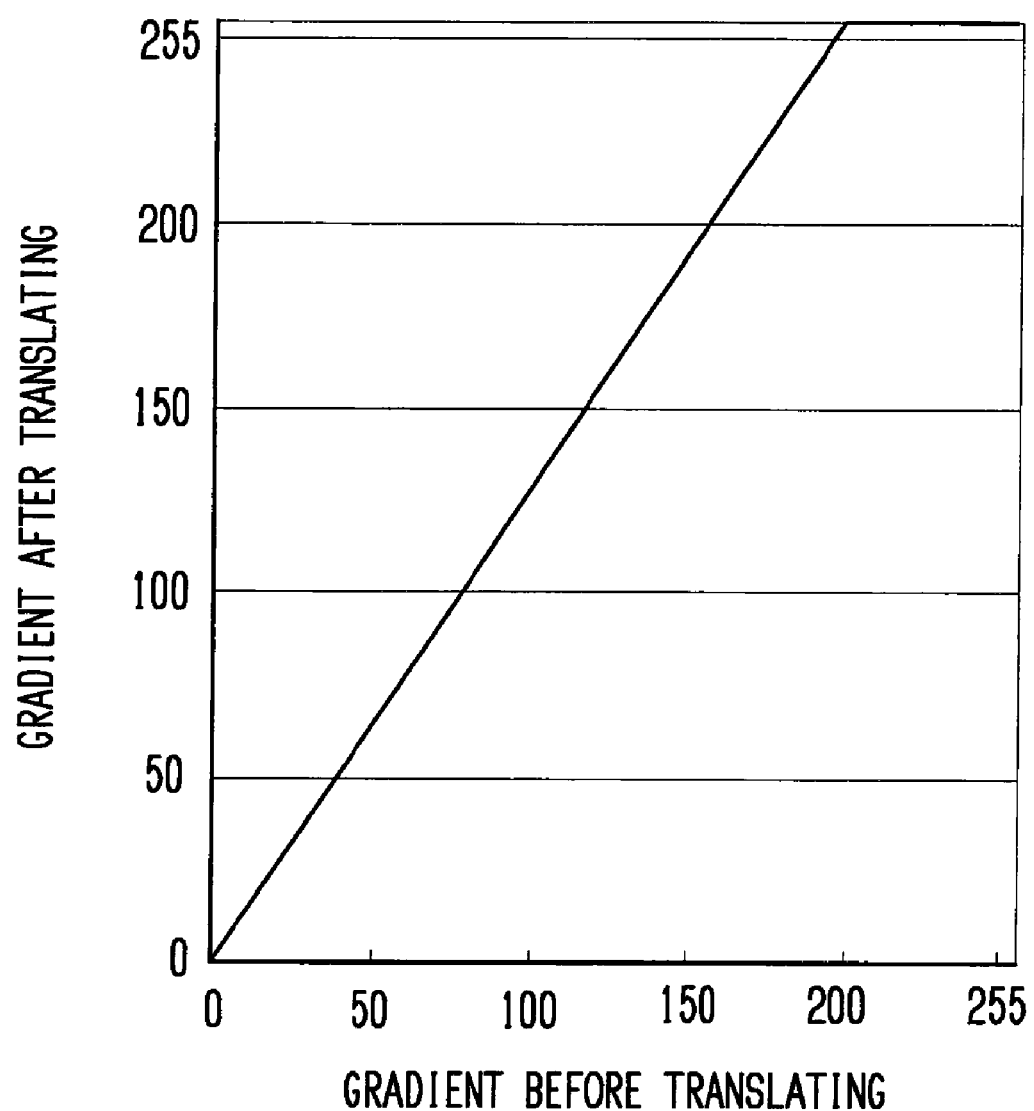
FIG. 7 is a graph to describe an embodiment of the density controlling process.

Referring to FIG. 6 and FIG. 7, a density controlling process performed on monochrome image data will be described below as an embodiment of the density controlling process.

When the image data called up from the RAM 403 is inputted to the gradient translator 605, the gradient translator 605 refers to the gradient translating table, which is set preliminarily in the LUT 606. The gradient translator 605 translates the inputted gradient of each pixel with one-to-one correspondence, and outputs the pixel data having the gradient after the translating. The gradient translator 605 outputs the image data on which is the translation of the gradient has been executed, after executing the translating process for each pixel of the inputted image data. For example, if the translation is executed reference with the gradient translating table in FIG. 6 (described above), the gradient of the inputted pixel shifts higher (toward the black level). At a result, it is possible to execute a process that causes the gradient of the outputted image data to be darker.

FIG. 7 is a graph showing the relationship of the gradient of a pixel before translating and the gradient of the pixel after translating, when the original image read into the gradient translator 605 is translated based on the gradient translating table in FIG. 6. As shown in FIG. 7, when the translation is executed based on the table shown in FIG. 6, most of the inputted pixels having a gradient that is more than approximately 200, are translated to the gradient 255 and shifted to the black level.

Another embodiment of the density controlling process will be described below with respect to FIG. 8(A)-(D). A lateral (right and left, or X direction)/longitudinal (up and down, or Y direction) coordinate of a pixel of the image data, which is read into the RAM 403 by the CCD line sensor 304, is designated as "i" and "j". When the number of pixels in a lateral direction of the image data is designated as "M" and the number of pixels in the longitudinal direction of the image data is designated as "N", the relationship between i and M is $1 \leq i \leq M$, and the relationship between j and N is $1 \leq j \leq N$.

If a given pixel in the image data which is called up from the RAM 403 is designated as $g(i, j)$, a square matrix A, which represents a 3×3 block of pixels having pixel $g(i,j)$ at it center, surrounds the pixel as shown in FIG. 8 (A), for example. A gradient of $g(i, j)$ is in the range $0 \leq$ gradient of $g(i, j) \leq 255$. Except for the pixel $g(i, j)$, there are eight pixels which are neighboring pixels of $g(i, j)$ in the matrix A. A voluntary operator, which carries out an operation for the 3×3 matrix A, is set preliminarily as the image processing parameter in the gradient translator 605. Like matrix A, the operator has a 3×3 area, and the operator is designated as a matrix B as shown in FIG. 8 (B). When the pixel signal called up from the RAM 403 is inputted to the gradient translator 605, an additive operation is carried out for the matrix A centering on $g(i, j)$ by the operator matrix B. As a result, the matrix A is translated to a matrix C. That is, when the center pixel in matrix C is designate as $g'(i, j)$, the operator matrix B determines a degree of translating the pixel from $g(i, j)$ to $g'(i, j)$.

As an example, the following describes the case in which the operator matrix B is set such as shown in FIG. 8 (C), and the additive operation for the matrix A is carried out. Values of each element in matrix B show a coefficient for the gradient of each element in the 3×3 matrix A. When the additive operation is executed for the matrix A by the matrix B, the operation is executed for each pixel in matrix A. In this case, only the center value in matrix B is set to a large value; therefore, it is possible to take a weighted average, which stresses a particular pixel in matrix A, as a result of the operation. A smoothing of the image data is executed by such an integration operation in a small area, and it is possible to translate the gradient.

When the operator matrix B is set as shown in FIG. 8 (D), unlike the example described above, an image sharpening is executed. In this case, it is possible to emphasize the part in which the character is changed significantly according to the arithmetic processing by increasing the density difference of the eight neighboring pixels. The sharpening of the image data is executed by such a differential operation in a small area, and as a result, it is possible to translate the gradient.

As described above, the density controlling process in the embodiment illustrated with respect to FIGS. 8(A)-(D) is a method for executing an arithmetic processing for a particular pixel and neighboring pixels in an arbitrary localized region of inputted image data. That is, an area for temporarily storing the image data is prepared in the gradient translator 605, and the pixel of the image data is inputted in series from the RAM 403 to the area for temporarily storing the image data every small area (for example, 3×3 area). The pixel data of the small area, which is read and stored into the gradient translator 605, is sent to the CPU 401. In this embodiment, the density of the image data can be controlled by calculating the sum of the result of the arithmetic processing and outputting the calculated sum, after weighting these data by the operator illustrated in FIGS. 8 (B)-(D). The operator serves as a filter. It is possible to translate to the desired gradient by choosing the operator appropriately. As a result, the density of the image data can be made to be darker. It is unnecessary to fix a size of the small area as 3×3. It is possible to choose the area arbitrarily, according to the size of an object which an operator desire to take out, for example, 5×5 or 7×7.

Figure 9A:
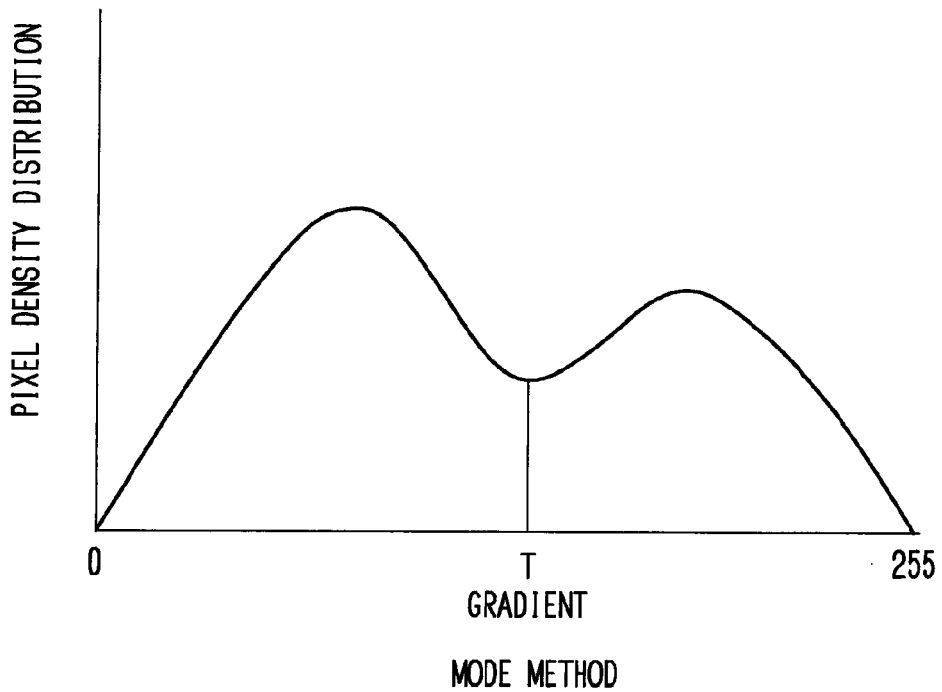
FIG. 9 is a graph to describe still another embodiment of the density controlling process.
Figure 9B:
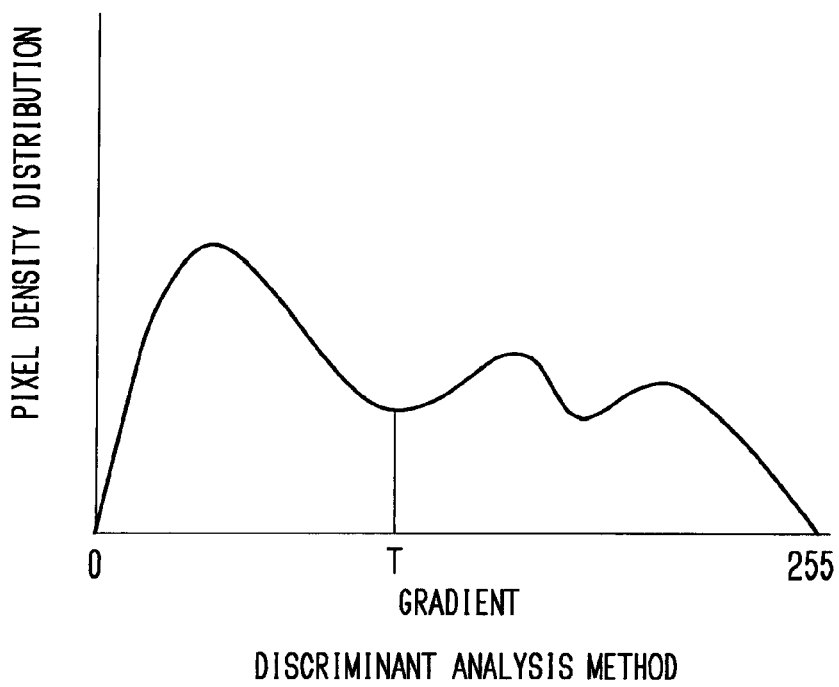

Still another embodiment of the density controlling process will be described below with respect to FIG. 9. This embodiment of the density controlling process is a method in which certain threshold is determined, and black is outputted if the gradient of the pixel of read image data exceeds the threshold, whereas white is outputted if the gradient of the pixel of read image data is below the threshold. Therefore, in this case, the gradient translator 605 in FIG. 5 serves as a binary circuit. Each pixel of the read image data is translated to binary data, i.e., 0 or 1, by the binary circuit in accordance with the set threshold, and outputted. 0 corresponds to white, and 1 corresponds to black. There are two methods to set the threshold. One is a method in which a predetermined value is set, and the other is a method in which a value is changed in accordance with the read image data. The latter method will be described below. There are many techniques that can be used to implement this latter method; however, a technique based on a density histogram is used in this embodiment.

The pixels in the read image data have a certain density distribution. FIG. 9 is a histogram showing the density distribution of the pixels. If the histogram is diphasic, as shown in FIG. 9 (A) for example, the threshold is set as a value between the two peaks. The method is called a mode method. If the histogram is not diphasic, for example as shown in FIG. 9 (B), it is assumed that an threshold "T" can divide the histogram into two groups, and a threshold "T" is set so as to maximize a variance ratio between the two groups. The method is called discriminant analysis method.

In this embodiment, CPU 401 executes the process for calculating the density distribution of a pixel of the image data stored in the RAM 403. Then, the mode method is chosen to set the threshold "T" if the density distribution is diphasic, and otherwise, the discriminant analysis method is chosen. After that, the 8 bits digital pixel signal for each pixel of the image data is progressively inputted to the binary circuit. It is determined whether the pixel signal should be the white level (0) or the black level (1) based on set threshold. The image data on which the binary process is executed is outputted to the printer 104 and the USB port 142 after the process is executed for each of pixels of the image data.

As described above, it is also possible to execute the process for causing a density of the image data to be darker, by choosing the threshold arbitrarily and outputting the inputted image data after executing the binary process.

The operator of the electronic blackboard 100 when the copy button 105 is pushed will be described below with reference to FIG. 10. When an operator pushes the copy button 105, the image on the screen 102 is read (S701), and the image data is stored in the RAM 403 (S702). After that, it is determined whether a density correcting flag is "ON" or not (S703). At this point, the density correcting flag cannot be set. "ON" unless the density controlling button 106, which will be described latter, is pushed. Therefore, the answer at step S703 is initially "NO." If the answer at step S703 is "NO," the image data is called up from the RAM 403 (S704). The CPU 401 then executes a process illustrated at steps S801 and S802 (described later) to determine whether or not the USB memory 150 is connected in the USB port 142 (S801). The image data called up from the RAM 403 is written in the USB memory 150 (S705) after being translated to the TIFF format data. Further, the printer 104 is driven, and the image data is printed on a paper (S709). At this point, it is possible to confirm whether the printed image is unclear, or thin, or unprinted.

After that, it is determined whether or not the density controlling button is pushed (S710). If the operator does not push the density controlling button 106 ("NO" at step S710), the data in the RAM 403 is cleared (S713), and the process is finished.

On the other hand, when an operator pushes the density controlling button 106, to instruct execution of the process for causing the density of the image data to be darker ("YES" at step S710), the density correcting flag in the RAM 403 is set "ON" (S711). In this situation, when an operator pushes the copy button 105 again ("YES" in step S712), the process returns to step S703. (If the operator does not push the copy button 105 again ("NO" in step S712), the data in the RAM 403 is cleared (S713) and the process is finished.) The answer at step S703 is now "YES" because the density correcting flag has been set "ON", and a process for calling up the image data (which was read from the RAM 403 and printed and saved previously) from the RAM 403 is executed (S706). The process of the image density control (S707) is executed for the image data called up in step S706 by the gradient translator 605. The CPU then executes a process illustrated at steps S801 and S802 (described later) to determine whether or not the USB memory 150 is connected in the USB port 142 (S801). The image data on which the image density control has been executed is written over the image data written in the USB memory 150 (S708) previously. The image data is also outputted to the printer 104 again, and printed out (S709). The data in the RAM 403 is cleared (S713), and the process is finished.

If the copy button 105 is not pushed in step S712 and a set time passes, a branch step S712 is determined as "NO". The data in the RAM 403 is cleared (S713), and a set of process is finished.

In this embodiment of the present invention, the printer 104 not only prints the image data written in the USB memory 150, but also prints a warning message which warns the operator if the USB memory 150 is not connected in the USB port 142.

More specifically, in steps S801 and S802 executed by the CPU 401, it is determined whether or not the USB memory 150 is connected in the USB port 142 (S801), by checking the data communication between the USB port 142 and the USB memory 150. When the USB memory 150 is not connected in the USB port 142 ("NO" at step S801), the warning message is written in the image data (S802), which is being outputted to the printer 104, and printed out (S709).

In more detail, the warning message is set previously in the image processing parameter section, which is provided in the ROM 402. When the image data called up from the RAM 403 is outputted to a line buffer in the printer 104, the warning message is written in a part of the outputted data.

On the other hand, when the USB memory 150 is connected in the USB port 142 ("YES" at step S801), the image data is written in the USB memory 150 (S705 or S708) and printed out (S709).

Another embodiment of the present invention will be described below with reference to FIG. 11. FIG. 11 is a flowchart showing operation of the electronic blackboard 100 when the copy button 105 is pressed according to another embodiment. The steps in FIG. 11 that are the same as those illustrated in FIG. 10 are designated with the same reference numeral, and a detailed description thereof is omitted. In addition, the structural elements that are the same as those described above with respect to FIGS. 1-10 are designated with the same reference numerals, and a detailed description thereof is omitted.

As shown in FIG. 11, when an operator pushes the copy button 105, the image on the screen 102 is read (S701), and the image data is written in the RAM 403 (S702). Unlike the embodiment described based on FIG. 10, it is not determined whether a density correcting flag is "ON" or not (that is, step S703 of FIG. 10 is omitted, and the density correcting flag of the process in FIG. 10 is omitted in the process of FIG. 11). The image data is called up from the RAM 403 (S704), and printed out (S709) after being written in the USB memory (S705).

At step S710, it is determined whether an operator has pushes the density controlling button 106 (S710). Unlike in the process illustrated in FIG. 10, if the operator pushes the density controlling button 106 ("YES" in step S710), it is not to push the copy button 105 again, and it is not necessary to turn on a density correcting flag (that is, steps S711 and S712 of FIG. 10 are omitted). When the density controlling button 106 is pushed according to the embodiment shown in FIG. 11, the image data is called up from the RAM 403 (S706), and the image density control (S707) is executed. The image data on which the image density control has been executed is written over the image data written in the USB memory 150 (S708) previously. The image data is outputted to the printer 104 again and printed out (S709). The data in the RAM 403 is cleared (S723), and the process is finished.

Figure 12:
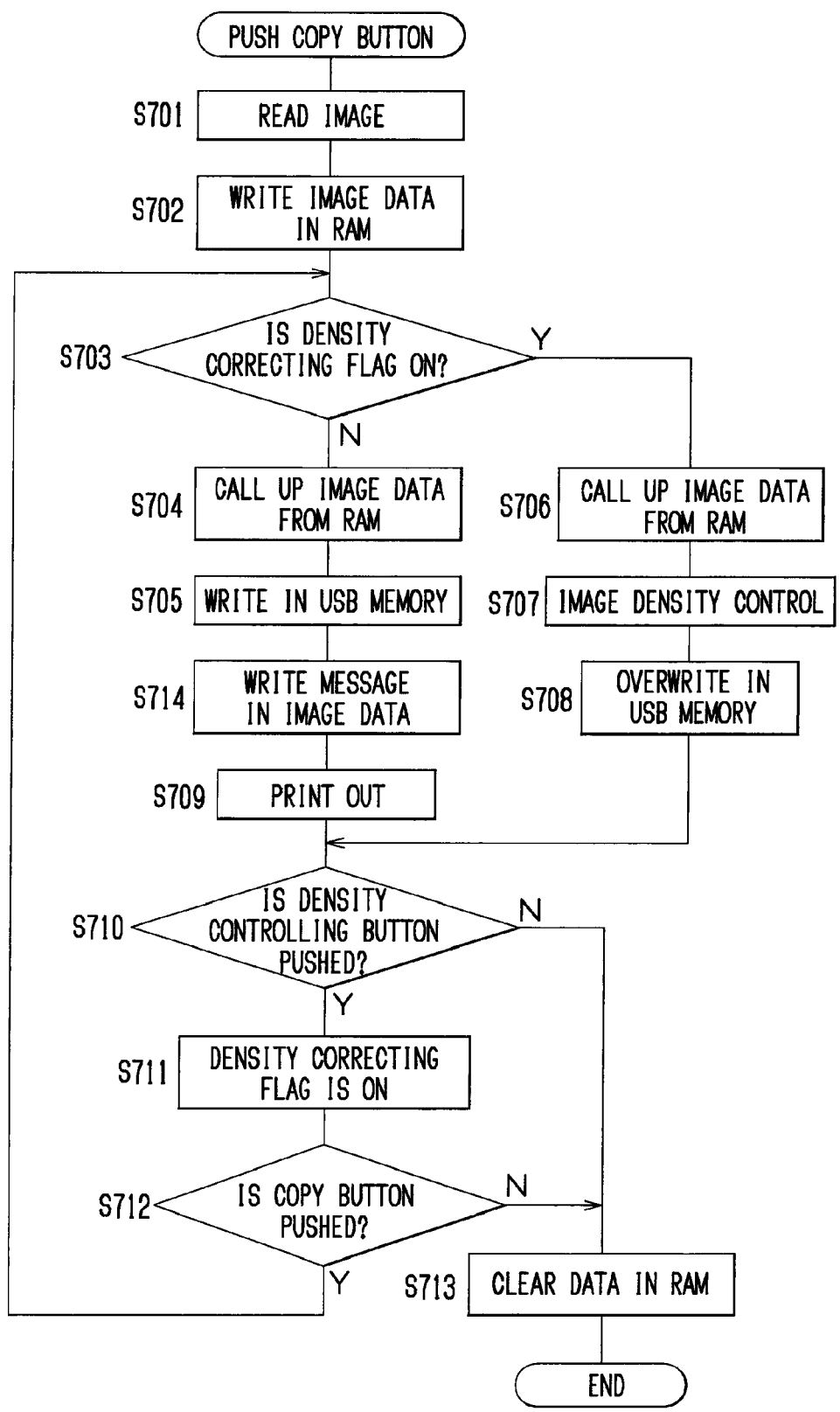
FIG. 12 is a flowchart showing operation of the electronic blackboard in still another embodiment of the present invention, when a copy button is pushed.

Still another embodiment of the present invention will be described below with reference to FIG. 12. FIG. 12 is a flowchart showing operation of the electronic blackboard 100 when the copy button 105 is pressed according to another embodiment. The steps in FIG. 12 that are the same as those illustrated in FIG. 10 are designated with the same reference numeral, and a detailed description thereof is omitted. In addition, the structural elements that are the same as those described above with respect to FIGS. 1-10 are designated with the same reference numerals, and a detailed description thereof is omitted.

As shown in FIG. 12, when an operator pushes the copy button 105, the image data is obtained and written in the USB memory 150 by the processes from step S701 to step S705.

Figure 10:
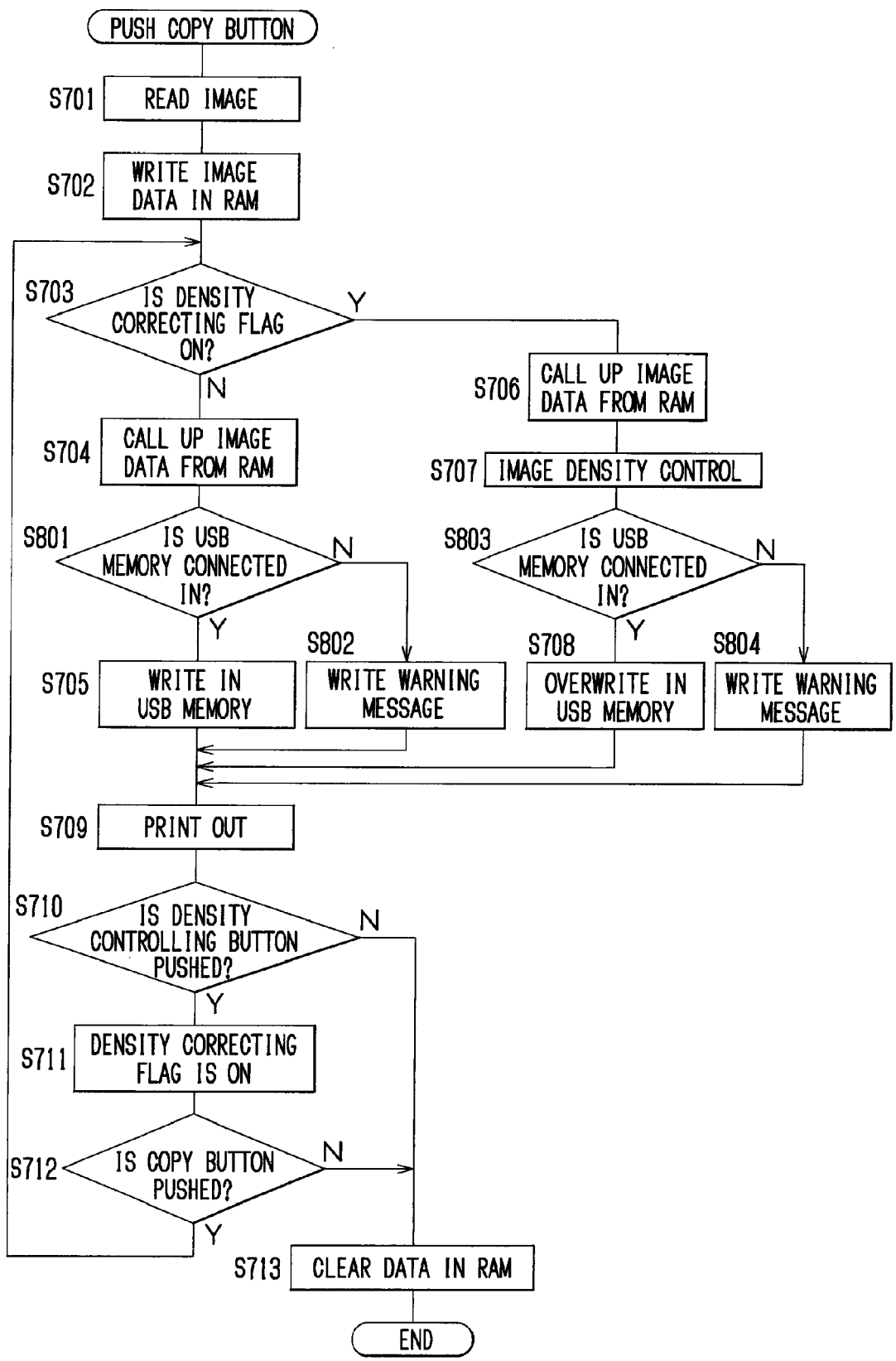
FIG. 10 is a flowchart showing operation of the electronic blackboard in an embodiment of the present invention, when a copy button is pushed.
Figure 11:
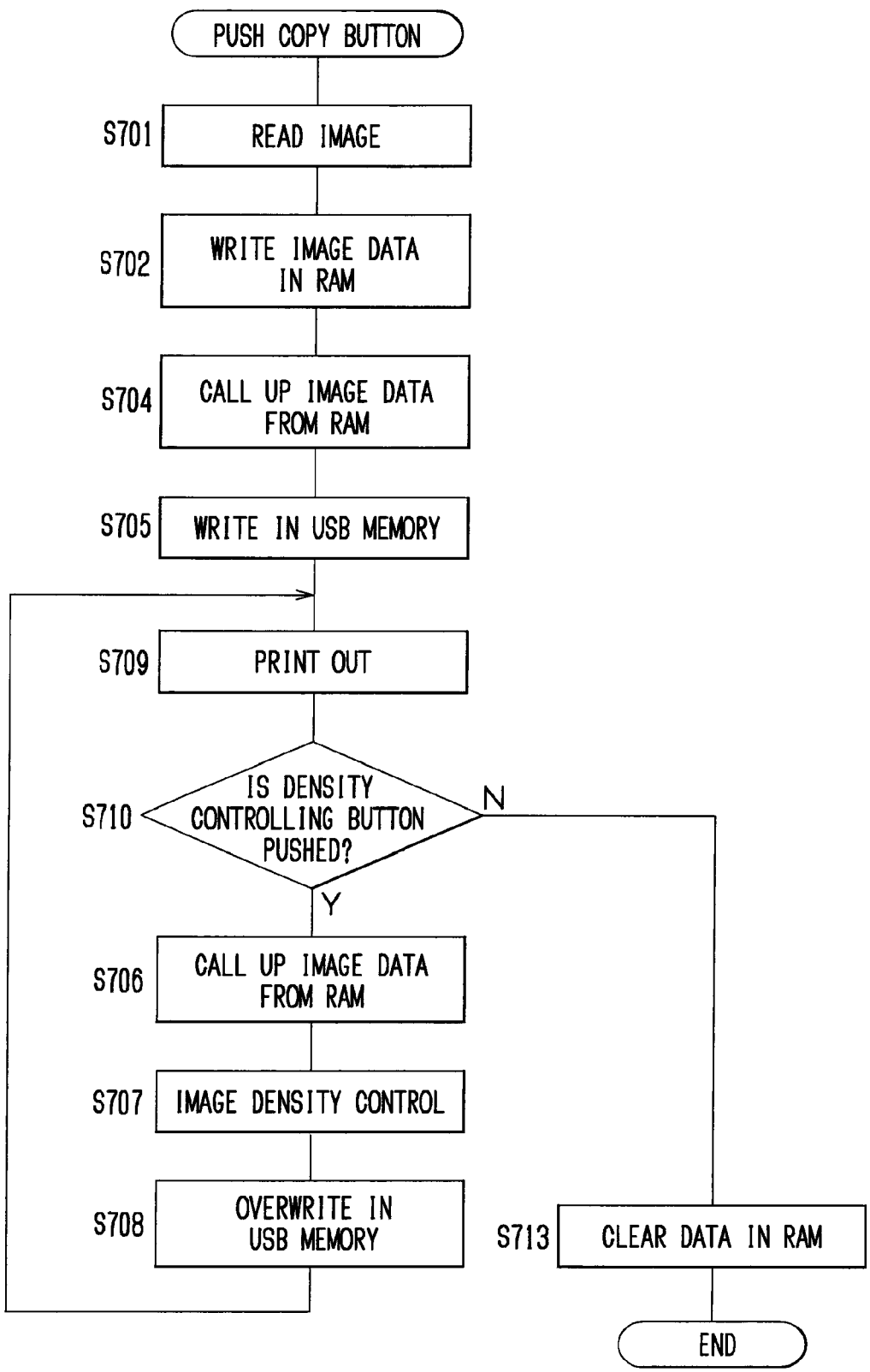
FIG. 11 is a flowchart showing operation of the electronic blackboard in another embodiment of the present invention, when a copy button is pushed.

Unlike the embodiment described based on FIG. 10, in the process shown in FIG. 12, a process is performed for writing a message for the operator in a part of the image data (S714) that is outputted to the printer 104. The message is for informing the operator that the image data is written in the USB memory 150, and for prompting the operator to confirm a printing density of the image. The message is set previously in the image processing parameter section provided in the ROM 402. The image data written with the message is printed out (S709).

When the operator pushes the density controlling button 106 (S710), the density correcting flag is set "ON" (S711), and the determination of step S712 is executed. In this situation, when the operator pushes the copy button 105 again, the process returns to step S703. The determination at step S703 is now "YES", and the processes from S706 to S708 are executed. However, unlike the embodiment described with respect to FIG. 10, the image on which the image density control is executed in step S707 is not printed again. That is, the image data is outputted to the USB port 142, but not to the printer 104. The data in the RAM 403 is cleared (S713), and the process is finished.

Figure 13:
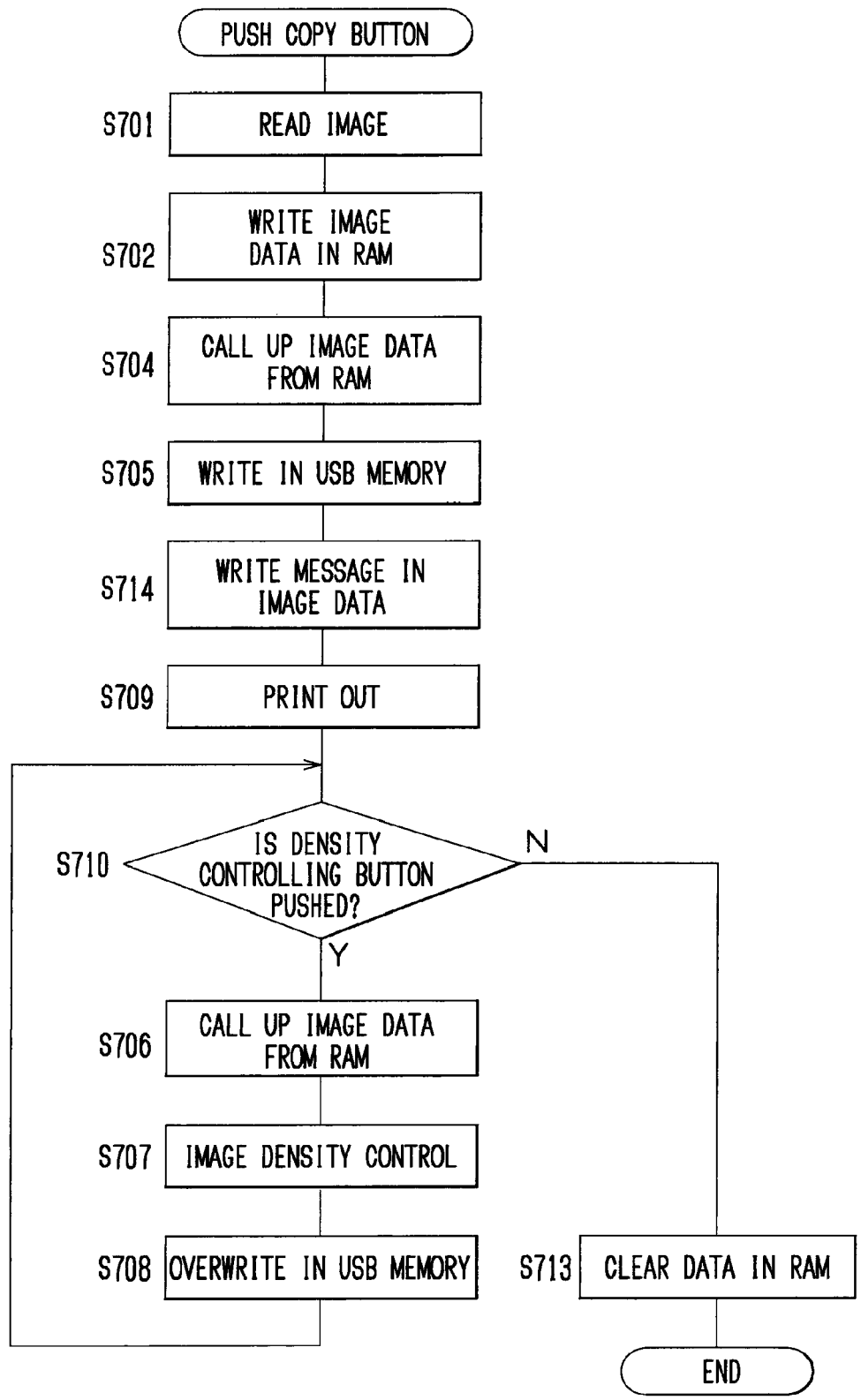
FIG. 13 is a flowchart showing operation of the electronic blackboard in still another embodiment of the present invention, when a copy button is pushed.

Still another embodiment of the present invention will be described with reference to FIG. 13. FIG. 13 is a flowchart showing operation of the electronic blackboard 100 when the copy button 105 is pressed according to another embodiment. The steps in FIG. 13 that are the same as those illustrated in FIG. 10 are designated with the same reference numeral, and a detailed description thereof is omitted. In addition, the structural elements that are the same as those described above with respect to FIGS. 1-10 are designated with the same reference numerals, and a detailed description thereof is omitted.

As shown in FIG. 13, when the operator pushes the copy button 105, the image data is obtained and written in the USB memory 150 by the processes from step S701 to step S705. Next, the message for the operator is written in a part of the image data (S714), and printed out (S709).

When an operator pushes the density controlling button 106 (S710), the image data is called up from the RAM 403 (S706) without pushing the copy button 105 again. Then the image density control is executed (S707). The image data executed the image density control is overwritten in the USB memory 150 (S708). Unlike the embodiment described based on FIG. 10, the printing is not executed again. The data in the RAM 403 is cleared (S713), and a set of process is finished.

Figure 14:
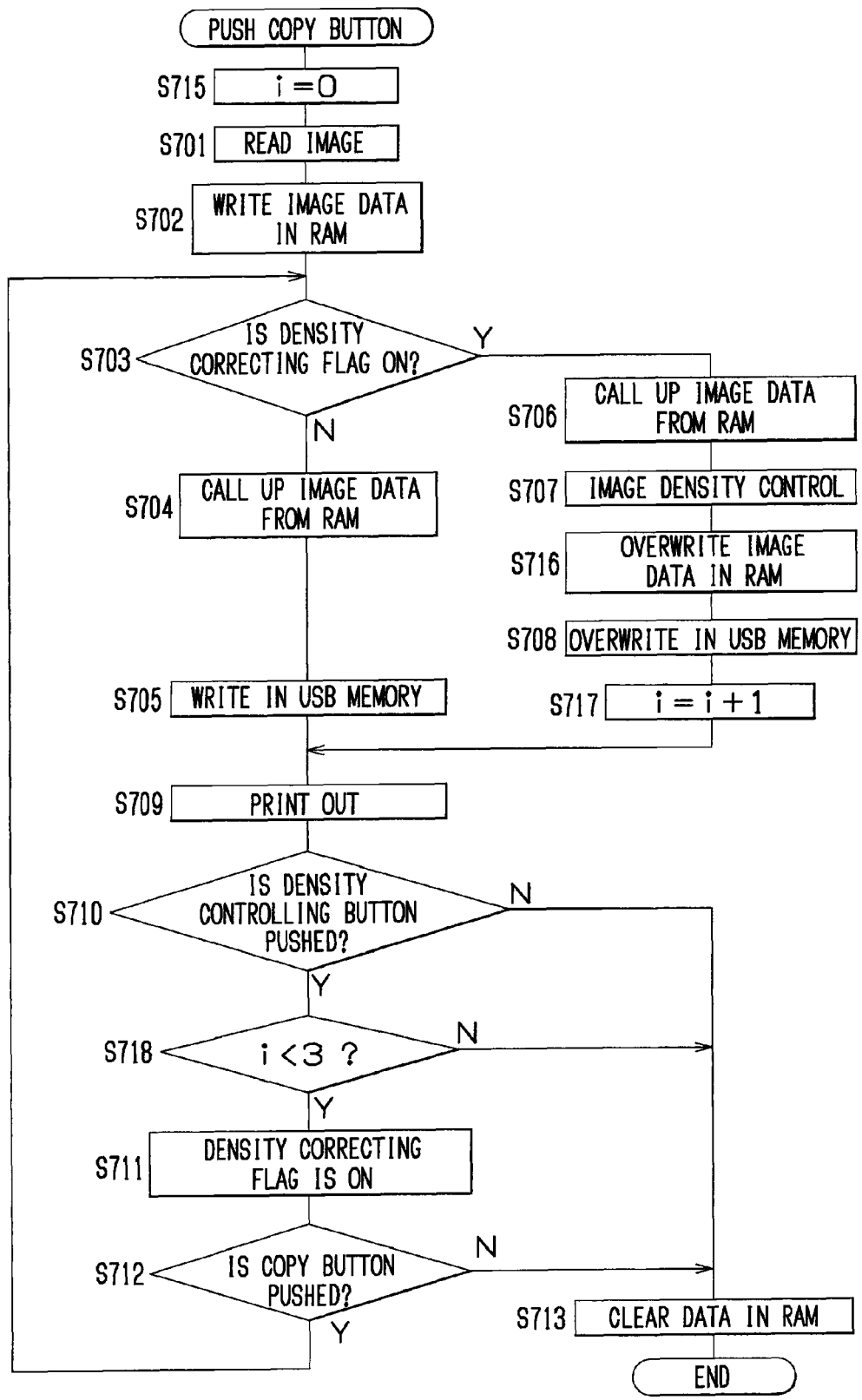
FIG. 14 is a flowchart showing operation of the electronic blackboard in still another embodiment of the present invention, when a copy button is pushed.

Still another embodiment of the present invention will be described below with respect to FIG. 14. FIG. 14 is a flowchart showing operation of the electronic blackboard 100 when the copy button 105 is pressed according to another embodiment. The steps in FIG. 14 that are the same as those illustrated in FIG. 10 are designated with the same reference numeral, and a detailed description thereof is omitted. In addition, the structural elements that are the same as those described above with respect to FIGS. 1-10 are designated with the same reference numerals, and a detailed description thereof is omitted.

When an operator pushes the copy button 105, 0 is stored as a parameter i (S715), and the processes from S701 to S709 are executed. Although the parameter i will be described latter in detail, it is an active parameter to restrict the number of times that the image density control is performed.

When an operator pushes the density controlling button 106 (S710) after confirming the image printed on a paper, a process for determining the value of the parameter i is executed (S718). The branch condition in step S718 is i<3, meaning that the image density control is allowed to be executed three times, to prevent the image density control from repeating infinitely. At the point, the branch step S718 is determined as "YES" and the density correcting flag is set "ON" (S711), because the parameter is in the initial state i=0. When the operator pushes the copy button 105 again (S712), the determination at step S703 is now "YES". The image data is called up from the RAM 403, and the image density control (S707) is executed. The image data executed the image density control is overwritten the image data written in the RAM 403 (S716) previously. Further, the image data overwritten in the RAM 403 is overwritten in the USB memory 150 (S708), and 1 is added to the parameter i (S717). Then, the image data is printed again (S709).

If the printed image still has a problem, such as an unclear portion, it is possible to execute the process for causing the image density to be darker in the gradient translator 605 again, by pushing the density controlling button 106 again. On the basis of the flowchart in FIG. 14, when the copy button 105 is pushed again in step S712 after determination at step S710 is "YES" again, the image density control is executed. In the present embodiment, an object of image density control is the image data overwritten in the RAM 403 in the previous step S716. As a result, it is possible to execute the superimposed image density control several times.

When the operator repeats the operation, in which the copy button 105 is pushed in step S712 after pushing the density controlling button 106, the process is looped, and the image density control can be executed gradually and several times. As described above, however, it is determined whether the parameter i is smaller than 3 in step S718, and therefore the image density control is not repeated infinitely. The number of times that the image density control is performed is set at a maximum of 3 times in FIG. 14. Therefore, if i=3, the determination at step S718 is "NO", and the image density control is not executed. The data in the RAM 403 is then cleared (S713), and the process is finished. It is possible to set the branch condition arbitrarily. That is, the condition at step S718 is not limited to i<3.

When the embodiment described based on FIG. 14 is executed, it is necessary to set the various parameters for using the density controlling process appropriately. There is a possibility that it is difficult to control the density gradually, if the density of the inputted image data is changed drastically. For example, in the embodiment of the density controlling process shown in FIG. 6, it is necessary to set the ratio of input/output change of the gradient translating table (the ratio between the gradient before translating the gradient of the original image and the gradient after translating) low. In addition, it is necessary to choose the value of the operator appropriately in the embodiment of the density controlling process shown in FIG. 8. For example, the value of the center operator of the square matrix of the small area is set so as not to be overlarge.

Still another embodiment of the present invention will be described with reference to FIG. 15 and FIG. 16. The steps and structural elements that are the same as those described above with respect to FIGS. 1-10 will be designated with the same reference numerals, and a detailed description thereof is omitted.

Figure 15:
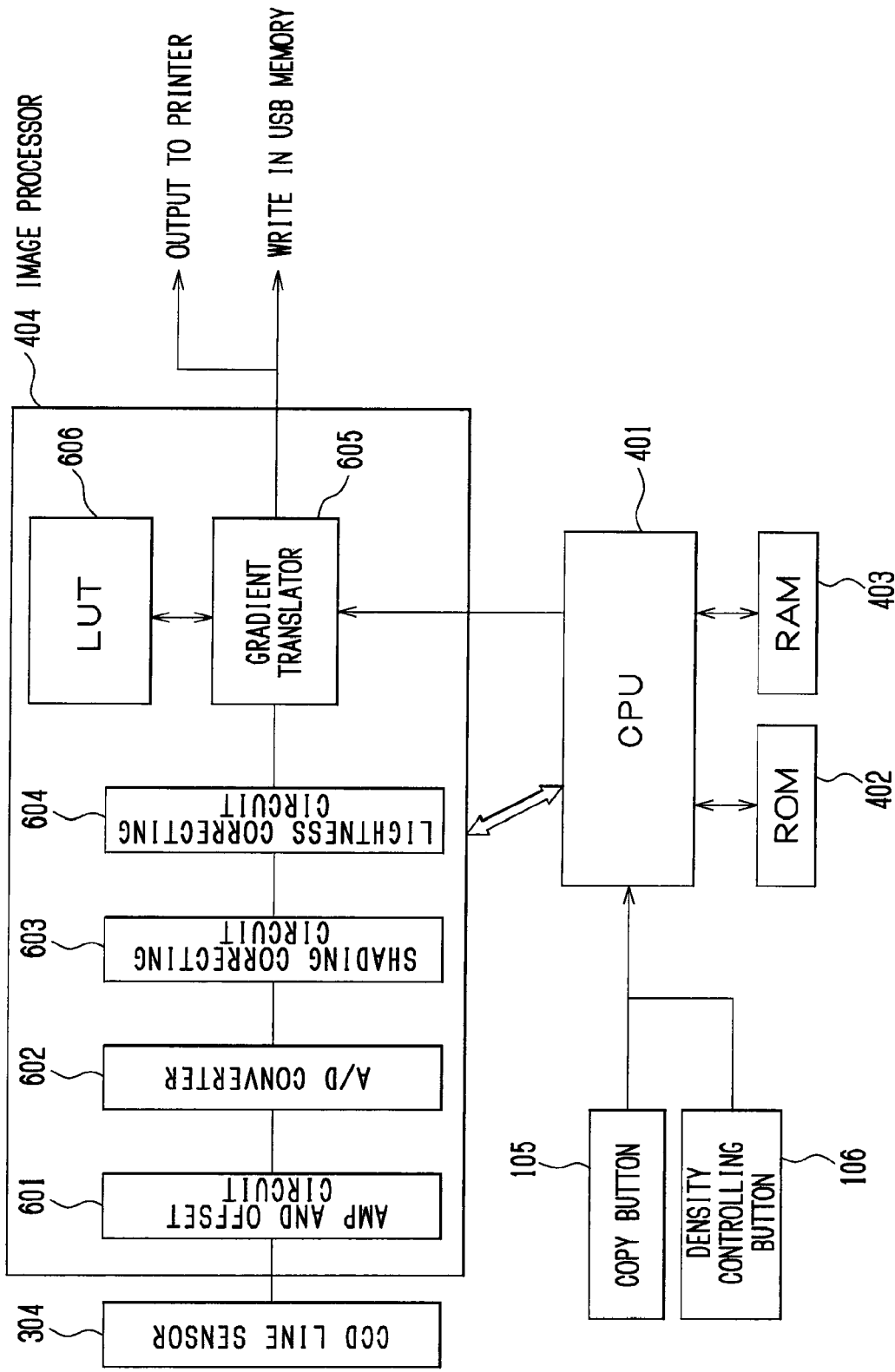
FIG. 15 is a block diagram showing a structure of an image processor in still another embodiment of the present invention.

FIG. 15 is a block diagram showing a structure of an image processor 404 in still another embodiment of the present invention.

In the embodiment shown in FIG. 15, an analog image signal inputted from the CCD line sensor 304 is inputted to an AMP and offset circuit 601, an A/D converter 602, shading correcting circuit 603, and a lightness correcting circuit 604 in order, and each of the respective image processes is executed by the circuits 601-604 (see the description of FIG. 5). An output end of the lightness correcting circuit 604 is connected to an input end of a gradient translator 605 for translating a gradient of a pixel. An output end of the gradient translator 605 is connected to a LUT 606. Unlike the image processor shown in FIG. 5, the image data outputted from the lightness correcting circuit 604 is inputted to the gradient translator 605. The gradient translator 605 refers to the LUT 606, and executes the process for causing the density of the image data to be darker. The image processor 404 has a structure so as to output the image data, on which each of the image processes has been executed, to the USB port 142 and to the printer 104.

Figure 16:
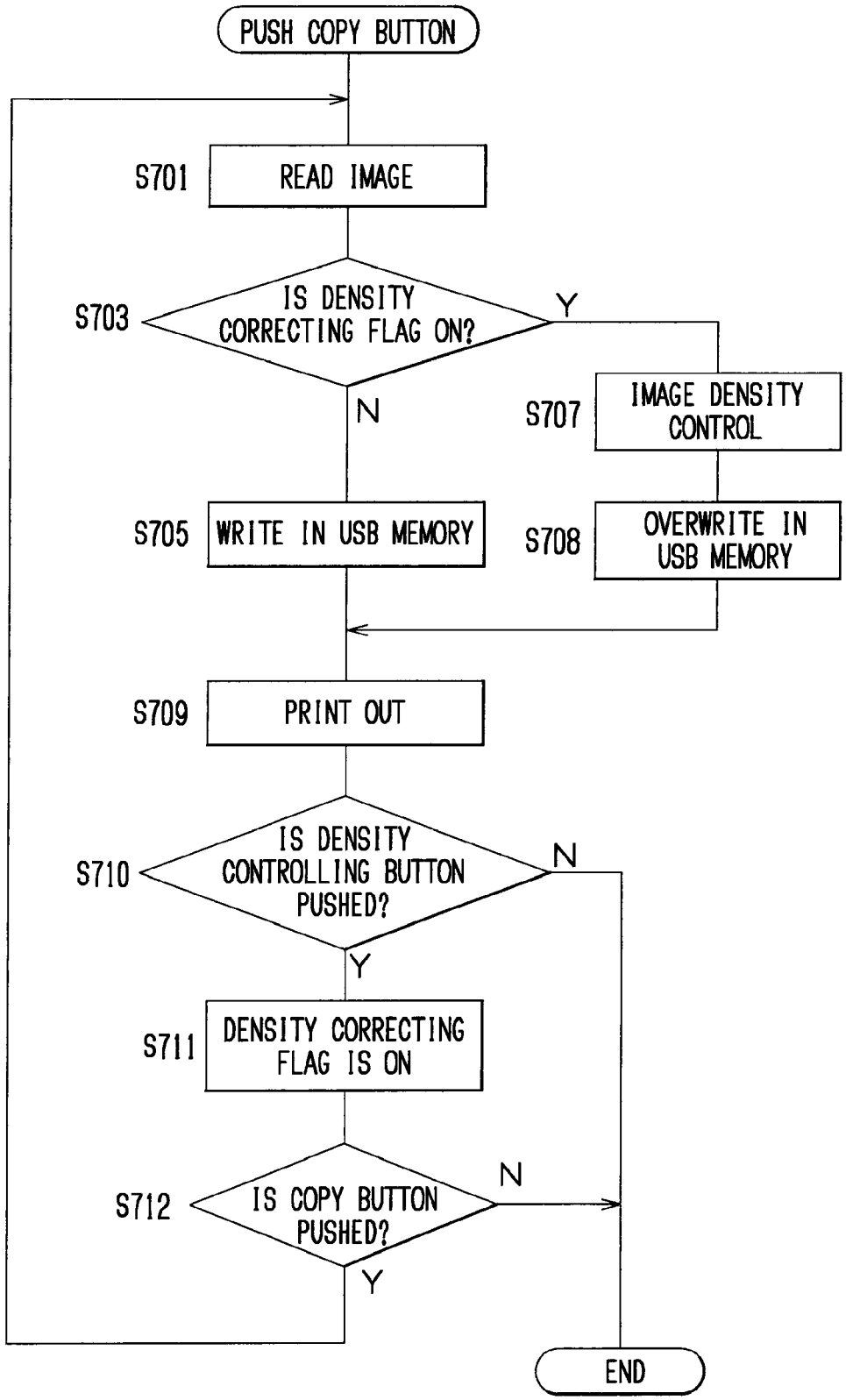
FIG. 16 is a flowchart showing operation of the electronic blackboard in still another embodiment of the present invention based on the image processor of FIG. 15, when a copy button is pushed.

FIG. 16 is a flowchart showing operation of the electronic blackboard 100 having the image processor shown in FIG. 15, when the copy button 105 is pushed. The steps in FIG. 16 that are the same as those illustrated in FIG. 10 are designated with the same reference numeral, and a detailed description thereof is omitted.

As shown in FIG. 16, when the operator pushes a copy button 105, an image written on the screen 102 is read (S701). The result of the determination at step S703 is "NO", and the image data read from the screen 102 is written to the USB memory 150 (S705), and printed out (S709). Unlike the embodiment described with respect to FIG. 10, the record of the image data is not left in the RAM 403, when these processes are executed.

When the printed image is unclear and the operator pushes the density controlling button 106, the result of the determination at step S710 is "YES", and the density correcting flag is set "ON" (S711). Further, when the operator pushes the copy button 105 again, the result of the determination at step S712 is "YES", and the process returns to step S701. As a result, unlike the embodiment described in FIG. 10, the image on the screen 102 is read again. The result of the determination at step S703 is now "YES", and the image data is inputted to the gradient translator 605. Then, the image density control is executed (S707). The image data on which the image density control is executed is printed on a paper again (S709) after overwriting the image data previously stored in the USB memory (S708). Then, the process is finished.

As described above, it is possible to confirm the state of image data stored in the USB memory 150 by directly checking the printed image. Therefore, the structure described above, enables storing the useful image data in the USB memory 150, and also, prevents the image data from failing to be written in an external storage medium.

Moreover, it is possible to execute the process for causing the density of the image data to be darker gradually according to another embodiment of the present invention. As a result, a user can obtain higher quality image data.

Obviously, numerous modifications and variations of the present invention are possible in light of the above teachings. It is therefore to be understood that within the scope of the appended claims, the invention may be practiced otherwise than as specifically described herein.

What is claimed is:

1. An electronic blackboard comprising:
    a writing surface;
    an optical reader for optically reading an image written on the writing surface and for outputting the read image as image data;
    a printer;
    a connector for removably connecting an external storage medium;
    an input device operable by an operator to input a copy instruction to instruct the optical reader to read the image on the writing surface, and a density control instruction for starting a density controlling process for causing a density of the image data of the read image to be darker;
    an image controller for executing the density controlling process on the image data of the read image;
    a memory for temporarily storing the image data outputted from the optical reader; and
    a controller;
    wherein the controller, in response to the copy instruction:
        controls the electronic blackboard to read the image on the writing surface optically by the optical reader;
        controls the electronic blackboard to print an image by the printer based on the image data outputted from the optical reader; and
        controls the electronic blackboard to temporarily store the image data outputted from the optical reader in the memory, and to store the image data in the external storage medium connected to the connector; and
    wherein the controller, in response to the density control instruction being input after the control performed in response to the copy instruction:
        controls the electronic blackboard to read the image data temporarily stored in the memory and to execute, with the image controller, the density controlling process on the read image data, and
        controls the electronic blackboard to update the image data stored in the external storage medium with the image data on which the density controlling process has been executed; and
    wherein the controller executes a process for determining whether or not the external storage medium is connected to the connector, and when the external storage medium is not connected to the connector, the controller causes the printer to print a warning message which informs the operator that the external storage medium is not connected to the connector.

* * * * *